United States Patent
Appelstal

(10) Patent No.: US 7,487,157 B2
(45) Date of Patent: Feb. 3, 2009

(54) METHOD AND SYSTEM FOR DELIVERING A MESSAGE

(76) Inventor: Lars Appelstal, Båtvägen 15, S-191 33 Sollentuna (SE)

( * ) Notice: Subject to any disclaimer, the term of this patent is extended or adjusted under 35 U.S.C. 154(b) by 102 days.

(21) Appl. No.: 10/492,297

(22) PCT Filed: Oct. 14, 2002

(86) PCT No.: PCT/SE02/01874

§ 371 (c)(1),
(2), (4) Date: Dec. 28, 2004

(87) PCT Pub. No.: WO03/032223

PCT Pub. Date: Apr. 17, 2003

(65) Prior Publication Data

US 2005/0097139 A1    May 5, 2005

(30) Foreign Application Priority Data

Oct. 12, 2001    (EP) .................................. 01124499

(51) Int. Cl.
*G06F 17/30*    (2006.01)
(52) U.S. Cl. ........................................ 707/10; 707/100
(58) Field of Classification Search ................ 707/10, 707/104.1, 100; 709/203, 206; 379/88.17; 382/100–101; 358/1.1, 400, 402, 403
See application file for complete search history.

(56) References Cited

U.S. PATENT DOCUMENTS

| | | | |
|---|---|---|---|
| 5,283,887 A | 2/1994 | Zachery | |
| 5,859,967 A | 1/1999 | Kaufeld et al. | |
| 6,023,700 A | 2/2000 | Owens et al. | |
| 6,031,625 A | 2/2000 | Sherman et al. | |
| 6,119,137 A | 9/2000 | Smith et al. | |
| 6,157,924 A | 12/2000 | Austin | |
| 6,393,464 B1 * | 5/2002 | Dieterman | 709/206 |
| 6,463,462 B1 * | 10/2002 | Smith et al. | 709/206 |
| 6,779,178 B1 * | 8/2004 | Lloyd et al. | 717/174 |
| 6,829,333 B1 * | 12/2004 | Frazier | 379/88.17 |
| 7,162,512 B1 * | 1/2007 | Amit et al. | 709/206 |

FOREIGN PATENT DOCUMENTS

| | | |
|---|---|---|
| EP | 0 917 075 A2 | 5/1999 |
| EP | 1 139 275 A2 | 10/2001 |
| GB | 2 305 090 A | 3/1997 |
| WO | WO 99 27467 A | 6/1999 |

OTHER PUBLICATIONS

European Search Rpt. Feb. 20, 2002.
Written Opinion Jul. 21, 2003.
Written Opinion Feb. 18, 2004.

* cited by examiner

*Primary Examiner*—Cheryl Lewis
(74) *Attorney, Agent, or Firm*—Potomac Patent Group PLLC

(57) ABSTRACT

A method and system for delivering a message from a sending party to a receiving party, where a data stream defining the message is received and information is retrieved from a recipient database in a message delivery unit at the sending party. A destination selector investigates the received data stream and compares the retrieved database information with the received data stream for automatically determining a delivery form, based on the comparison. Details regarding the delivery form may be selected according to preferences of the receiving party stored in the recipient database. Thereby, labor efforts and costs can be minimized, and delivery form and details are automatically determined based on the received message data stream for each individual message, without requiring any separate supervising control signaling.

18 Claims, 2 Drawing Sheets

METHOD AND SYSTEM FOR DELIVERING A MESSAGE

TECHNICAL FIELD

The present invention relates generally to a method and system for delivering a message to a receiving party. In particular, the message is transmitted electronically according to preferences of the receiving party.

BACKGROUND OF THE INVENTION AND PRIOR ART

In this description, the word "message" will be used in the broad sense of any written text and/or images intended to be read and/or analysed by a receiving party, i.e. one or more persons and/or machines, such as computers and processors for automated actions and handling of the message.

Today, electronic transmission of messages is used extensively instead of sending messages in paper form, e.g., by using an ordinary post mail service. The well-known e-mail system is typically used all over the world for sending messages electronically between communicating stations, such as Personal Computers PCs, work stations, mobile terminals or the like. The messages may be written in a text format designed for the e-mail system, and files in any format may further be attached thereto optionally. Messages are thus transmitted in a digitally encoded form over various networks, such as local networks, public regional networks and the Internet. In this way, messages can be transmitted over any distance, be it between computers located in the same room or in different parts of the world.

Yet, many enterprises and institutions still send various messages in the printed paper form regularly to different receiving parties, such as customers, vendors, members, private households etc., using an ordinary post mail service. By way of a few examples, the messages may be invoices, forms, information letters, business offers, etc. However, there are some evident drawbacks to this traditional way of distributing messages.

Firstly, there is a significant delay before a message reaches the receiver, typically at least one day if transmitted within the same country. The post mail service also varies greatly between different countries, and it can sometimes take weeks to reach a receiver in a different country.

Secondly, there is always a certain risk that the posted message does not reach the receiver at all, for some reason. There is also a risk that the message is intercepted by an unauthorised person, and expensive measures are sometimes taken to ensure that the message reaches the intended receiver and no-one else.

Thirdly, it is generally costly to handle physical papers, in particular when they are distributed over long distances. The cost of human labour and equipment for handling outgoing post mail is often significant for enterprises or institutions sending large amounts of messages in letters to many receivers. Furthermore, if actions are to be taken in response to a message in paper form at the receiving side, a certain amount of manual work is required for, e.g., reading and registering the message, inputting commands to a computer, etc. If a message is received electronically, automated actions in response thereto are enabled, and both humans and machines can read and analyse the message.

In all these respects, e-mail is deemed to be superior and to be preferred before post mail.

However, some message receiving parties may not prefer to receive messages by e-mail after all, or may not even be capable to do so due to lack of required computer hardware or software. Further, in some cases, the e-mail address of the receiver, e.g., a new customer, may not be known. If an enterprise or institution sends large amounts of messages, e.g., invoices, to many different receiving parties, e.g., customers, significant efforts are required to determine for each individual message whether the receiver prefers e-mail or post mail delivery or has any specific preferences regarding details of the delivery form. It is therefore a problem that time consuming and/or costly routines must be employed for differentiating the sending of messages by either e-mail, post mail, fax or any other form, according to specific requirements for specific types of messages, depending on the preferences of individual receiving parties. Another problem is that most existing mailing routines are adapted to printed papers, and it would be advantageous if those routines could be preserved to a great extent also when sending messages electronically.

There are known solutions for mass mailing of documents where either post delivery or electronic delivery is selected based on delivery preferences stored in a database. However, a certain amount of supervising control signalling is then required, which is separate from the actual print streams, in order to perform the relatively simple selection between the basic delivery forms. Bandwidth and functionality must then be provided for communicating and interpreting the control signals, which increases complexity and costs.

A simpler and less costly procedure is thus desirable where more detailed customer preferences can be taken into account for determining delivery form and details for individual messages when electronic delivery is selected, without requiring any supervising control signalling.

SUMMARY

It is an object of the present invention to overcome the drawbacks outlined above. These and other objects are achieved by providing a method and system for delivering a message from a sending party to a receiving party, wherein a data stream is received defining the message. The received data stream is preferably adapted to printing. Information is retrieved from a recipient database, and the received data stream is investigated by comparing the retrieved database information with the received data stream. A delivery form is then determined based on the investigation and comparison, such that the message can be delivered in the determined delivery form. This inventive procedure is performed automatically in a message delivery unit at the sending party.

It may be determined to deliver the message in an e-mail if a match is detected between the retrieved database information and the received data stream. The match may be detected by finding an identification of the receiving party in both the retrieved database information and the received data stream. Alternatively, it may be determined to deliver the message in a post mail or fax if no match is detected between the retrieved database information and the received data stream.

The retrieved database information may include a delivery indication of the receiving party, such that the delivery form can be determined according to the delivery indication. It may then be determined to deliver the message in an e-mail, and delivery details may be determined according to the delivery indication. Further, the delivery indication may include preferences of the receiving party for selecting at least one of: delivery by e-mail, delivery by post mail, delivery by fax and preferred details regarding the electronic format and/or content of the message for e-mail delivery. The delivery indication may further be selectively specified for different types of messages.

The format of the message may be selected as an attached file for e-mail delivery. Alternatively, the format of the message may be selected as raw data extracted from the received data stream for e-mail delivery, such that the receiving party can create a suitable electronic file or a printed document from the raw data.

The received data stream may be investigated according to a predefined logic by scanning at least certain predetermined fields of the data stream for identifying the receiving party and/or the message.

If it is determined to deliver the message in an e-mail, an electronic certificate may be attached to the message based on an agreement established between the message sending party and the receiving party. The message may, as an e-mail, further include a link to at least one electronic address for enabling automatic actions by the receiving party in response to the message.

According to another aspect of the invention, the inventive system for delivering a message from a sending party to a receiving party is implemented in a message delivery unit at the sending side. The message delivery unit comprises a printer driver for receiving a data stream defining the message, and a destination selector. The destination selector is adapted to retrieve information from a recipient database, to investigate the received data stream, to compare the retrieved database information with the received data stream, and to determine a delivery form of the message based on the comparison, automatically.

According to further aspects of the invention, a computer program product is directly loadable into a computer in the message delivery unit, comprising software code means for performing the inventive method.

Alternatively, a computer program product is stored on a computer usable medium, comprising readable program for causing a computer in the message delivery unit to perform the inventive method.

The form and details for message delivery are thus automatically determined and selected for each individual message according to recipient preferences. Thereby labour efforts and costs can be minimised, and the need for any separate supervising control signalling is eliminated.

BRIEF DESCRIPTION OF THE DRAWINGS

The present invention will now be described in more detail and with reference to the accompanying drawings, in which.

DESCRIPTION OF PREFERRED EMBODIMENTS

Figure 1:
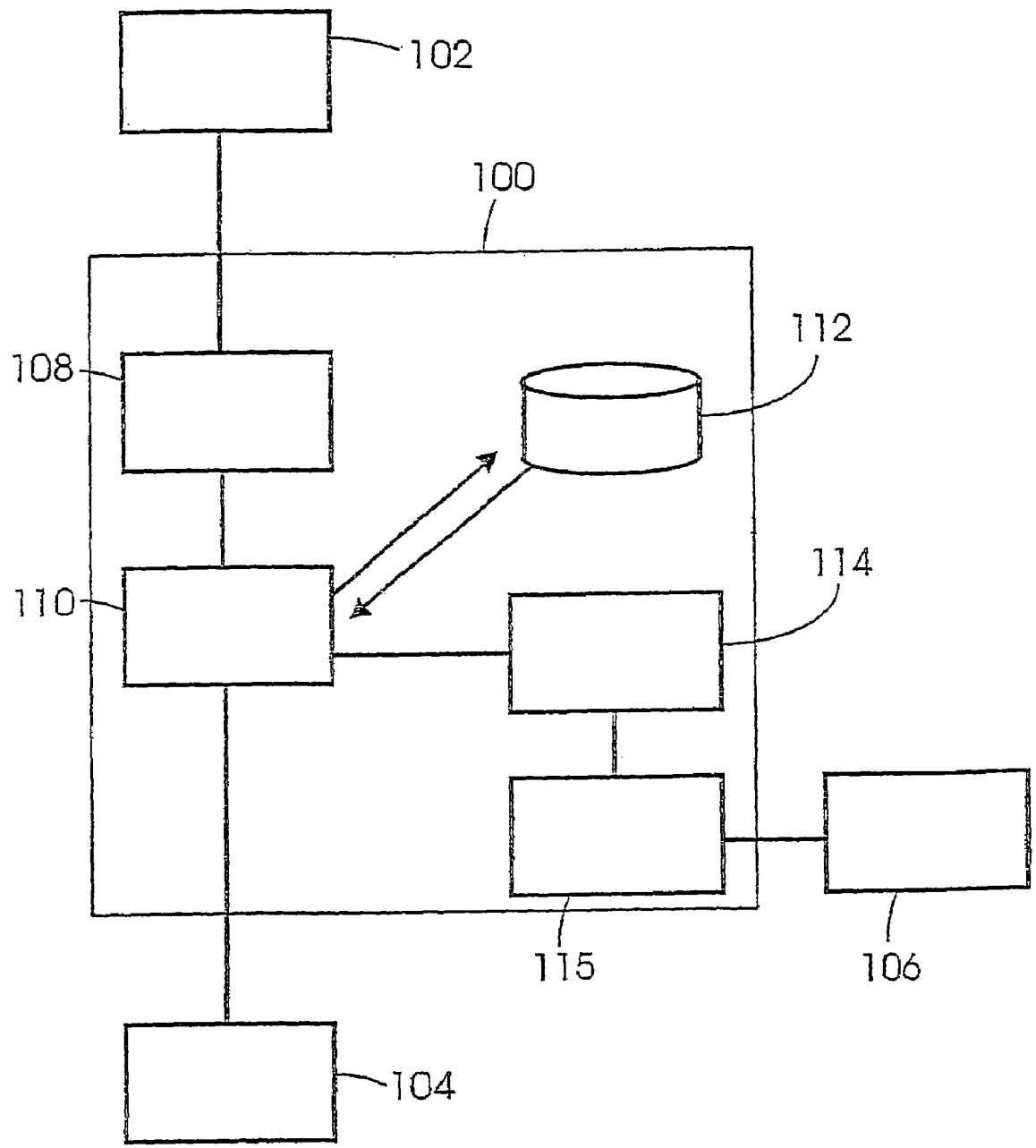
FIG. 1 is a schematic block diagram of a message delivery system.

FIG. 1 illustrates schematically an exemplary message delivery system in which the invention may be implemented. In order to illustrate the invention, a scenario will be described below for sending an invoice as a message to a customer as a receiving party. However, the invention is not limited to this example, but may be used for generally delivering any messages to any receiving parties.

In FIG. 1, a message delivery unit 100 is shown which is connected to a message generating unit 102, a printer unit 104 and an e-mail sending unit 106, respectively. In this example, the message generating unit 102 generates an invoice intended for transmission to a specific customer. The message delivery unit 100 comprises a printer driver 108 for receiving the invoice from the message generating unit 102 as a data stream comprising information normally used for printing the invoice in paper form. The message generating unit 102 may thus generate a normal printer data stream regardless of whether the message is to be delivered electronically or in paper form by post or fax.

The data stream from the message generating unit 102 includes information on the invoice content, such as texts, lines, tables, images, layouts etc., preferably in a format normally used as input to document printers according to a predefined printer standard, which will not be described here further. The printer driver 108 thus acts as any ordinary printer driver towards the message generating unit 102, which does not need to be modified in this case. However, any data stream format may be used within the scope of the invention.

According to one aspect of the invention, the message delivery unit 100 further comprises a destination selector 110 for determining whether a message is to be delivered electronically by e-mail, in paper form by post mail or fax, or any combination thereof, and for determining delivery details when e-mail delivery is selected. The destination selector 110 receives the invoice data stream from the printer driver 108 and investigates the received data stream. The destination selector 110 is further configured to retrieve information from a recipient database 112 in order to determine the delivery form and details. The destination selector 110 may then investigate if a match exists between the received invoice data stream and the retrieved database information.

The recipient database 112 is in this example a customer database and may reside within the message delivery unit 100, as shown in FIG. 1, or may alternatively be an external or remote database which can be accessed by the destination selector 110. The recipient database 112 may be created and maintained by the message sending party, e.g., an enterprise or institution, or by a third party.

The recipient database 112 thus contains information on registered recipients, in this case customers, such as name, address, customer code and/or various other specifications. The database 112 may further include a delivery indication for each registered customer, for indicating delivery preferences, such as whether the customer prefers to receive certain messages, in this case invoices, by e-mail or post mail or fax or any combination thereof.

The delivery indication may be designed in many different ways within the scope of the present invention. For example, e-mail delivery may be indicated by the mere presence of the customer's e-mail address in the database 112, or simply by the fact that the customer is registered in the database 112. More detailed indications, e.g., different codes for different preferences, such as regarding file formats as well as delivery form, may also be used. Moreover, these delivery indications may be selectively specified for certain messages or types of messages. For example, invoices may be indicated for electronic delivery in a certain format and/or content disposition, and information letters may be indicated for paper delivery.

Returning to FIG. 1, the destination selector 110 compares the retrieved information from the recipient database 112 with the received invoice data stream. The received data stream is thus investigated, which may be done by scanning the complete contents of the data stream or at least certain predefined fields thereof. Certain words or codes may be searched for identifying the receiving party and/or the invoice according to a predefined logic in the destination selector 110. According to one embodiment of the invention, e-mail delivery is selected simply if a match between the database information and the data stream is detected. If no match is detected, e.g., because the customer is not registered in the database 112, post mail is selected by default for delivering the invoice. According to another embodiment of the invention, the delivery form is determined depending on a delivery indication for the customer found in the retrieved information from the recipient database 112, as described above. Thus, a customer may for example be registered but indicated to prefer post mail delivery only.

If e-mail delivery and details thereof are determined and selected in the described procedure, the invoice data stream is transferred to a document unit 114 in the message delivery unit 100 for creating an electronic version of the invoice in a selected suitable electronic format such as pdf, tiff, jpeg, or the like. As mentioned above, the electronic format may be selected according to preferences specified in the delivery indication.

The electronic invoice is then forwarded to an e-mail generating unit 115 for creating an e-mail, preferably including the electronic invoice as an attached file, to the customer. The invoice data stream may alternatively be transmitted as raw data extracted therefrom, such that the receiving party can create from the received raw data a file and/or printed document in any suitable form. These various format alternatives described above will preferably depend on the customer's preferences, which again may vary between different types of messages, as indicated in the database.

The created e-mail is finally forwarded to the e-mail sending unit 106 for delivering the invoice electronically to a receiving station of the target customer, not shown. Alternatively, the e-mail generating unit 115 may be capable of sending the e-mail directly, in which case no separate e-mail sending unit 106 is needed.

On the other hand, if post mail or fax delivery is selected, the invoice data stream is transferred to the printer unit 104 for printing a paper copy of the invoice, which is then delivered to the customer by means of post mail or fax. In this case, the message delivery unit 100 is completely transparent since the invoice data stream is forwarded unaffected to the printer unit 104 in its original format for printing.

According to another embodiment of the invention, an electronic certificate may be attached to the message when sent by e-mail, in order to increase the level of security. An agreement may thus be established between the message sending party and the receiving party for authorizing the transmission of certain messages, such as invoices. The agreement is then confirmed in the message by including the electronic certificate to ensure the receiver that the message comes from this particular sending party.

According to a further embodiment of the invention, the sending party may store information on the sent message in a message database, not shown.

Figure 2:
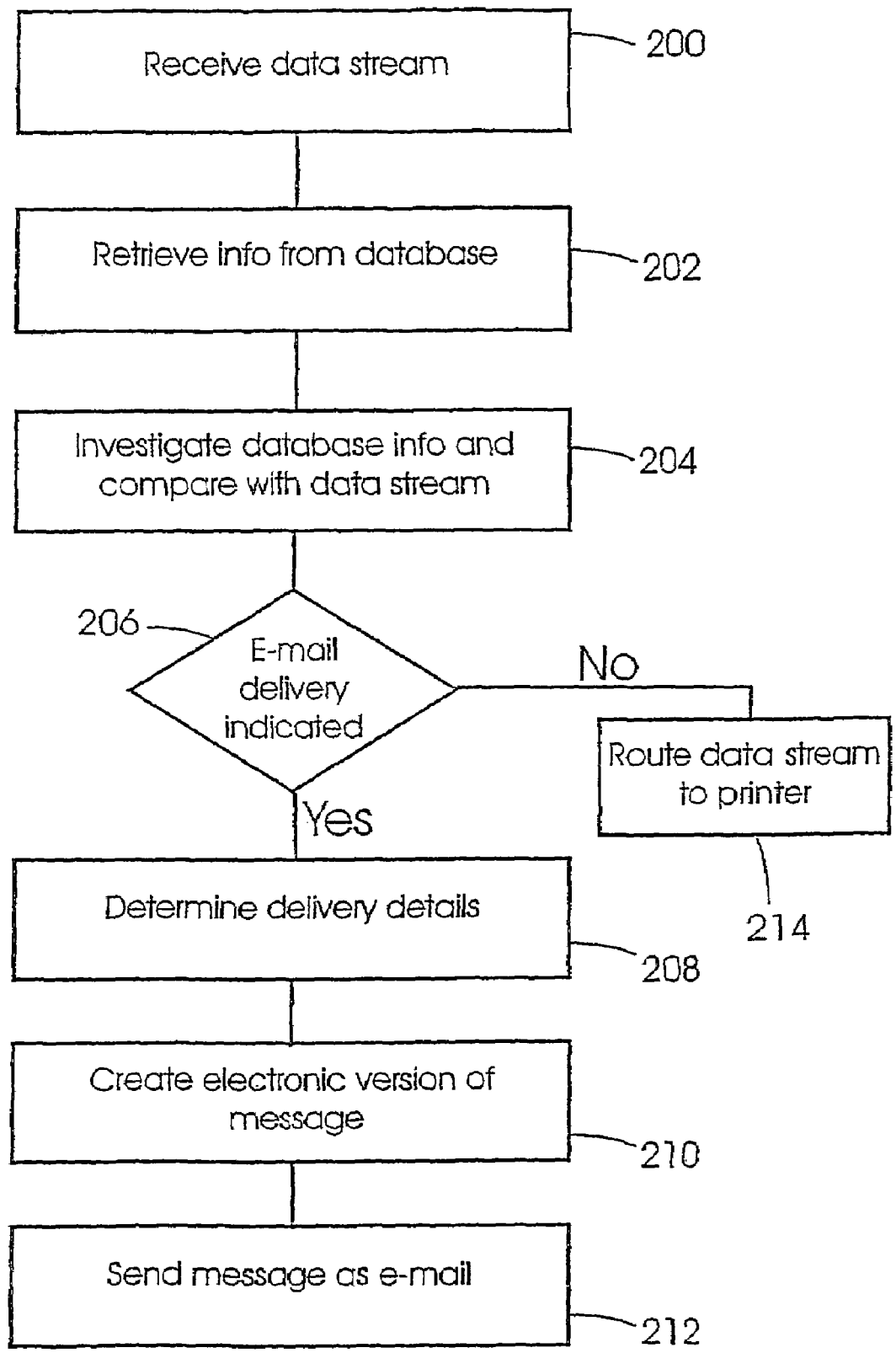
FIG. 2 is a flow chart illustrating an exemplary procedure for delivering a message.

The inventive procedure for delivering a message will now be generally described with reference to the flow chart illustrated in FIG. 2. In a first step 200, a message data stream is received, defining a message to be delivered to a receiving party. Next in step 202, information is retrieved from a recipient database, and the retrieved database information is investigated and compared with the message data stream in step 204. It is then determined in step 206 whether e-mail delivery of the message is indicated, based on the investigation and comparison made in the previous step 204.

In one embodiment of the invention, e-mail delivery is indicated if a match is detected in step 204 between the retrieved database information and the received data stream. If no such match is found, post mail or fax delivery is selected instead. For example, the received data stream defining the message may contain some identification of the receiving party, such as a name or code, which may also be specified in a database entry for the receiving party which has been stored therein. If such an identification is found in both the database and the data stream, a match exists. The presence of the receiving party identification in the recipient database thus indicates e-mail delivery, and the absence thereof indicates post mail or fax delivery in this embodiment.

In another embodiment of the invention, delivery form and details are determined and selected based on a specific delivery indication stored in the recipient database for the receiving party. The delivery indication then indicates a preference of the receiving party for delivery by e-mail, post mail, fax or any combination thereof. The delivery indication may further indicate preference details regarding the delivery form, such as file formats, message content disposition, different preferences for different types of messages, etc.

If it is determined in step 206 that the message is to be delivered by e-mail, delivery details are determined in step 208 and an electronic version of the message in a suitable format is created in step 210 from the message data stream. The format may preferably be a specified image based file format such as pdf, tiff and jpeg, depending on recipient preferences. Alternatively, the message may remain as raw data extracted from the received data stream, as described above in connection with FIG. 1. If no preference for the format is found in the database, a default format may be selected. The electronic message is then finally sent to the receiving party as an e-mail in step 212.

If, however, it is determined in step 206 that the message is to be delivered by post mail or fax, the message data stream is routed to a printer in step 214 for printing the message in paper form, which then can be sent to the receiving party, either by post or by fax.

As mentioned above, a delivery indication may indicate delivery in both electronic and paper form, in which case the determination step 206 may be modified to execute both step sequence 208-212 and step 214.

The various embodiments of the invention described above provide for automatic selection of message delivery by e-mail or post mail or fax, and for the determination of details or parameters for e-mail delivery according to preferences of the receiving party. Labour efforts and costs for providing selective delivery of messages electronically or in paper form are thereby minimised. Furthermore, if a message is delivered by e-mail, actions to be taken by the receiver in response to the message can be automated at the receiving side, such as analyzing and registering the message, inputting commands to a computer, etc. Thus, both humans and machines can read and analyse the electronic message. An electronic message may also include links to various electronic addresses, e.g., of banks, for enabling automated actions, such as payments to bank accounts.

Moreover, the invention provides for automatic determination of delivery details for each individual message when electronic delivery is selected, by taking into account detailed customer preferences. The inventive procedure is based on the message data stream, which is investigated for each message, without requiring any separate supervising control signalling.

The message delivery unit performing the inventive method is more or less transparent to the sending and receiving parties, and modifications are thus not required on either side, whereby routines adapted to printed papers can be preserved to a great extent also when messages are sent electronically.

The features of the described examples may be modified within the scope of the invention, in particular regarding the configuration and practical implementation of the described functional units, as well as regarding the various described conditions for determining a delivery form and details thereof. In particular, the different components 108-115 in the message delivery unit 100 should merely be considered as logical function units having characteristics described above, and can in practice be implemented by using any suitable combinations of hardware and software. The term "e-mail" represents in this context any kind of mail system for transferring messages electronically.

The inventive method may be implemented in a software code comprised in a computer program product, directly loadable into a computer in the message delivery unit, or stored on a computer usable medium in the message delivery unit.

While the invention has been described with reference to specific exemplary embodiments, the description is only intended to illustrate the inventive concept and should not be taken as limiting the scope of the invention. Various alternatives, modifications and equivalents may be used without departing from the spirit of the invention, which is defined by the appended claims.

The invention claimed is:

1. A computer implemented method for determining a delivery form of a message to be delivered from a sending party to a receiving party, the method comprising the steps of:
   A) receiving a data stream defining the message wherein the received data stream is adapted for printing,
   B) retrieving information from a recipient database,
   C) investigating the received data stream and comparing the retrieved database information with the received data stream to detect a match between the retrieved database information and the received data stream,
   D) determining a form for delivering the message based on the investigation and comparison, wherein steps A)-D) are performed automatically in a message delivery unit at the sending party, the message delivery unit being implemented by a combination of hardware and software;
   E) delivering the message in an e-mail if a match is detected between the retrieved database information and the received data stream, the match being detected by finding an identification of the receiving party in both the retrieved database information and the received data stream; and
   F) printing the message if the form for delivering the message is determined to be one of a post mail or a fax.

2. The method of claim 1, wherein the message is delivered via one of a post mail and fax if a match is not detected between the retrieved database information and the received data stream.

3. The method of claim 1, wherein the retrieved database information includes a delivery indication of the receiving party and the form for delivering the message is determined according to the delivery indication.

4. The method of claim 3, wherein details of delivery are determined according to the delivery indication.

5. The method of claim 3, wherein the delivery indication includes preferences of the receiving party for selecting the at least one of delivery by e-mail, delivery by post mail and delivery by fax and preferred details regarding at least one of the electronic format and content of the message for e-mail delivery.

6. The method of claim 5, wherein the format of the message is selected as an attached file for e-mail delivery.

7. The method of claim 5, wherein the format of the message is selected as raw data extracted from the received data stream for e-mail delivery, the receiving party creating a suitable electronic file or a printed document from the raw data.

8. The method of claim 3, wherein the delivery indication is selectively specified for different types of messages.

9. The method of claim 1, wherein the received data stream is investigated according to a predefined logic by scanning at least certain predetermined fields of the data stream for identifying the receiving party and the message.

10. The method of claim 1, wherein an electronic certificate is attached to the message based on an agreement established between the message sending party and the receiving party.

11. The method of claim 1, wherein the message includes a link to at least one electronic address for enabling automatic actions by the receiving party in response to the message.

12. A system for delivering a message from a sending party having a message delivery unit to a receiving party, the system comprising:
   a printer driver for receiving a data stream defining the message, the data stream being adapted for printing;
   a destination selector for
      automatically retrieving information from a recipient database,
      investigating the received data steam,
      comparing the retrieved database information with the received data stream to detect a match between the retrieved database information and the received data stream, and
      determining a delivery form of the message based on the comparison for delivering the message wherein said message delivery unit is implemented by a combination of hardware and software;
   an e-mail sending unit for delivering the message in an e-mail if a match is detected between the retrieved database information and the received data stream, the match being detected by finding an identification of the receiving party in both the retrieved database information and the received data stream; and
   a printer unit for printing paper copy of the message if the form for delivering the message is determined to be one of a post mail or a fax.

13. The system of claim 12, wherein the destination selector comprises a predefined logic for investigating the received data stream by scanning at least certain predetermined fields of the data stream for identifying at least one of the receiving party and the message.

14. The system of claim 12, wherein the message delivery unit comprises a document unit for creating a suitable electronic format version of the message.

15. The system of claim 12, wherein the message delivery unit comprises an e-mail generating unit for creating an e-mail including the message to the receiving party.

16. A system according to claim 12, wherein the message delivery unit further comprises means for attaching an electronic certificate to the message, based on an agreement established between the message sending party and the receiving party if the delivery form is determined to be an e-mail.

17. The system of claim 12, wherein the message delivery unit comprises means for including a link to at least one electronic address in the message, enabling automatic actions by the receiving party in response to the message.

18. A computer-readable storage medium having instructions stored thereon for determining a delivery form of a message to be delivered from a sending party to a receiving party, the instructions, when executed on a processor, causes the processor to:
A) receive a data stream defining the message wherein the received data stream is adapted for printing,
B) retrieve information from a recipient database,
C) investigate the received data stream and compare the retrieved database information with the received data stream to detect a match between the retrieved database information and the received data stream,
D) determine a form for delivering the message based on the investigation and comparison, wherein steps A)-D) are performed automatically in a message delivery unit at the sending party, the message delivery unit being implemented by a combination of hardware and software;
E) deliver the message in an e-mail if a match is detected between the retrieved database information and the received data stream, the match being detected by finding an identification of the receiving party in both the retrieved database information and the received data stream; and
F) print the message if the form for delivering the message is determined to be one of a post mail or a fax.

* * * * *